US012566651B2

(12) United States Patent (10) Patent No.: US 12,566,651 B2
Peeters et al. (45) Date of Patent: Mar. 3, 2026

(54) ERROR DETECTION FOR ENCRYPTION OR DECRYPTION KEYS

(71) Applicant: STMicroelectronics International N.V., Geneva (CH)

(72) Inventors: Michael Peeters, Tourinnes-la-Grosse (BE); Pierre-Alexandre Blanc, Evere (BE)

(73) Assignee: STMicroelectronics International N.V., Geneva (CH)

( * ) Notice: Subject to any disclaimer, the term of this patent is extended or adjusted under 35 U.S.C. 154(b) by 68 days.

(21) Appl. No.: 18/612,406

(22) Filed: Mar. 21, 2024

(65) Prior Publication Data

US 2024/0320074 A1 Sep. 26, 2024

(30) Foreign Application Priority Data

Mar. 24, 2023 (FR) ...................................... 2302830

(51) Int. Cl.
*G06F 11/07* (2006.01)
*H04L 9/30* (2006.01)

(52) U.S. Cl.
CPC .......... *G06F 11/0751* (2013.01); *H04L 9/304* (2013.01); *H04L 9/3066* (2013.01)

(58) Field of Classification Search
CPC ................. G06F 11/0751; G06F 7/586; G06F 2207/7204; G06F 7/72; H04L 9/304; H04L 9/3066; H04L 9/004; H04L 9/0662; H04L 9/3033; H04L 9/3093; H04L 2209/805
USPC ....................................................... 714/764
See application file for complete search history.

(56) References Cited

U.S. PATENT DOCUMENTS

| | | | | |
|---|---|---|---|---|
| 6,516,064 | B1 * | 2/2003 | Osawa | ............. G11B 20/00318 |
| | | | | 713/193 |
| 11,146,387 | B1 * | 10/2021 | Andreadakis | ......... H04L 9/0869 |
| 2004/0071293 | A1 * | 4/2004 | Yamamichi | ........... H04L 9/3093 |
| | | | | 380/277 |

(Continued)

FOREIGN PATENT DOCUMENTS

EP 3698513 B1 12/2021

OTHER PUBLICATIONS

Bellafqira et al., "Proxy Re-Encryption Based on Homomorphic Encryption," ACSAC 2017, Dec. 4-8, 2017, Orlando, FL, USA, pp. 154-161.

(Continued)

*Primary Examiner* — James C Kerveros

(74) *Attorney, Agent, or Firm* — Seed IP Law Group LLP

(57) ABSTRACT

The present description concerns a method of checking a first data element, executed by an electronic device comprising a processor and a memory, wherein the first data element is divided in N second data elements being stored in the memory, and first data element being equal to the sum, modulo the dimension of a space comprising the first data element, of the N second data elements, wherein an image of the first data element by a LCG function is stored in the memory, and the method comprising a step of checking if the image of the first data element by the LCG function is equal to the sum, modulo the module of the LCG function, of a product of an integer varying from 0 to N−1 and an image of the dimension by the LCG function, and of the images of the second data elements by the LCG function.

20 Claims, 4 Drawing Sheets

(56) References Cited

U.S. PATENT DOCUMENTS

2013/0067016 A1* 3/2013 Adkins .............. G06F 12/1466
709/208

OTHER PUBLICATIONS

Kreuzer, "Verification of the $(1-\delta)$-Correctness Proof of Crystals-Kyber with Number Theoretic Transform," FAVPQC 2022: International Workshop on Formal Analysis and Verification of Post-Quantum Cryptographic Protocols, Oct. 24, 2022, Madrid, Spain, 16 pages.

L'Ecuyer, "Tables of Linear Congruential Generators of Different Sizes and Good Lattice Structure," *Mathematics of Computation* 68(225):249-260, Jan. 1999.

Panda et al., "A Coupled Variable Input LCG Method and Its VLSI Architecture for Pseudorandom Bit Generation," *IEEE Transactions on Instrumentation and Measurement* 69(4):1011-1019, Apr. 2020.

Pistono et al., "Cryptosystem Conversion, Packing and Matrix Processing of Homomorphically Encrypted Data: Application to IOT Devices," IEEE Access, IEEE, USA, vol. 9, Feb. 11, 2021, pp. 28302-28316.

Ravi et al., "Fiddling the Twiddle Constants—Fault Injection Analysis of the Number Theoretic Transform," IACR, International Association for Cryptologic Research, vol. 20220623:100515, Jun. 23, 2022, pp. 1-24.

* cited by examiner

ERROR DETECTION FOR ENCRYPTION OR DECRYPTION KEYS

BACKGROUND

Technical Field

The present disclosure generally concerns the computerized processing of critical and/or secret data, and, more particularly, the computational security of the processing of such data. The present disclosure more particularly relates to the checking and detection of errors of such a data element, such as an encryption and/or decryption key used in computer-based data storage, communication, or other computing functionalities.

Description of the Related Art

Different techniques of securing secret and/or critical data are currently used. Data encryption is one of them, and consists of the application of one or a plurality of encryption algorithms to data. Many encryption algorithms use encryption and/or decryption keys.

Before using an encryption and/or decryption key, it is common to check whether the encryption key stored in the memory is correct, that is, exhibits no error.

It would be desirable to be able to at least partly improve certain aspects of checking and/or error detection methods.

BRIEF SUMMARY

There exists a need for a more efficient securing mechanism of critical and/or secret data.

There exists a need for a more efficient securing mechanism of encryption and/or decryption keys.

An embodiment overcomes all or part of the disadvantages of methods of checking and/or of detection of errors of a data element.

An embodiment provides more secure methods of checking and/or of detection of errors of a data element.

An embodiment provides methods of checking and/or of detection of errors of a data element which do not make said data element accessible.

An embodiment provides methods of checking and/or of detection of errors of a data element having an additive decomposition.

An embodiment provides a method of checking and/or of detection of errors of a data element which is faster to execute.

An embodiment provides a method of checking a first data element, executed by an electronic device comprising a processor and a memory, wherein said first data element is not stored in said memory and is divided in N second data elements independent from the first data element, each second data element being stored in said memory, and first data element being equal to the sum, modulo the dimension of a space comprising said first data element, of said N second data elements, wherein an image of the first data element by a linear congruential generation function is stored in said memory, and said method comprising a step, executed by said processor, of checking if said image of the first data element by said linear congruential generation function is equal to the sum, modulo the module of said linear congruential generation function, of a product of an integer varying from 0 to N−1 and an image of said dimension by said linear congruential generation function, and of the images of said second data elements by the linear congruential generation function.

Another embodiment provides an electronic device comprising a processor and a memory, and configured to implement a method of checking a first data element, wherein said first data element is not stored in said memory and is divided in N second data elements independent from the first data element, each second data element being stored in said memory, and first data element being equal to the sum, modulo the dimension of a space comprising said first data element, of said N second data elements, wherein an image of the first data element by a linear congruential generation function is stored in said memory, and said method comprising a step, executed by said processor, of checking if said image of the first data element by said linear congruential generation function is equal to the sum, modulo the module of said linear congruential generation function, of a product of an integer varying from 0 to N−1 and an image of said dimension by said linear congruential generation function, and of the images of said second data elements by the linear congruential generation function.

According to an embodiment, at least one of said N second data elements is obtained randomly.

According to an embodiment, said dimension is a prime number.

According to an embodiment, to compute the image of a variable by the function, the following successive steps are implemented:

decomposition of said variable into a polynomial; and application of said function to said polynomial.

According to an embodiment, the image of a radical of said polynomial by said function has already been previously computed.

According to an embodiment, integer N is greater than or equal to two.

According to an embodiment, the first data element is an encryption and/or decryption key.

According to an embodiment, said first data element is a secret data element capable of being used in different types of encryption algorithm such as elliptic curve encryption algorithms, RSA encryption, signature algorithms such as those known under trade name CRYSTALS-Dilithium, or key encapsulation algorithms known under trade name CRYSTALS-Kyber.

Another embodiment provides a method of using first data element comprising the method of checking said first data element described previously.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front," "back," "top," "bottom," "left," "right", etc., or relative positions, such as terms "above," "under," "upper," "lower," etc., or to terms qualifying directions, such as terms "horizontal," "vertical," etc., it is referred, unless specified otherwise, to the orientation of the drawings.

Unless specified otherwise, the expressions "about," "approximately," "substantially," and "in the order of" signify plus or minus 10%, preferably of plus or minus 5%.

The embodiments described hereafter relate to the checking and/or the detection of errors of a data element, for example, before its use or its storage in a memory. This more precisely concerns the checking and/or the detection of errors of a critical and/or secret data element, such as an encryption and/or decryption key.

The embodiments described hereafter more particularly concern a cyclic redundancy check method, or checking method, where the data element which is checked is never made accessible. For this purpose, the checking method uses a decomposition into a plurality of data elements of this data element and a linear congruential generation function (LCG). The type of decomposition used herein is an additive decomposition. This is described in details in relation with FIG. 2. Further, a detailed description of a linear congruential generation function is made in relation with FIG. 3. The actual checking method is described in relation with FIG. 4.

Figure 1:
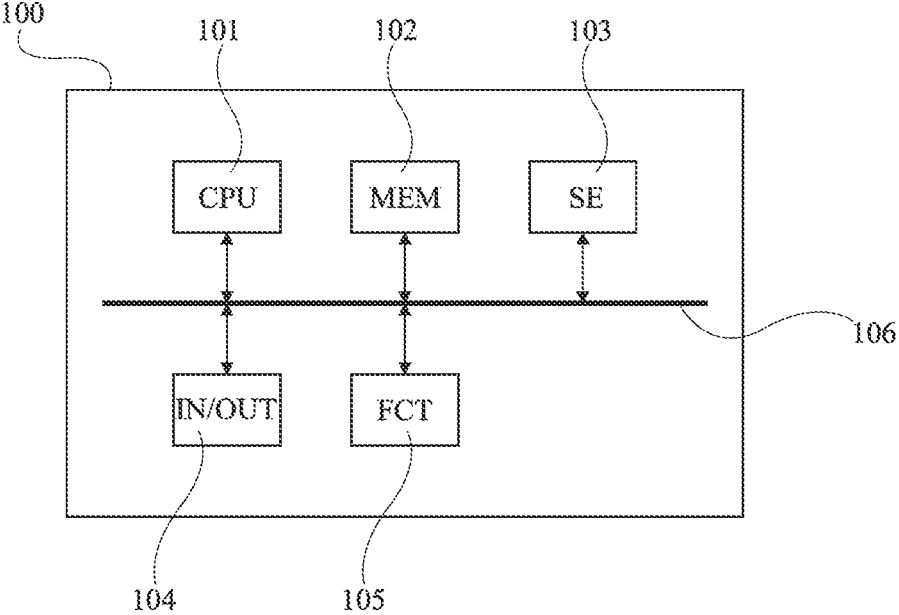
FIG. 1 very schematically shows in the form of blocks an example of an electronic device adapted to implementing the embodiments described in relation with FIGS. 2 to 4.

FIG. 1 is a block diagram very schematically showing an architecture of an example of an electronic device 100 adapted to executing the implementation mode of the cyclic redundancy check method, or checking method, of a data element described hereafter.

Electronic device 100 comprises a processor 101 (CPU) adapted to implementing different processings of data stored in memories and/or supplied by other circuits of device 100.

Electronic device 100 further comprises different types of memories 102 (MEM), among which, for example, a non-volatile memory, a volatile memory 103, and/or a ROM 104. Each memory 102 is adapted to storing different types of data.

Electronic device 100 further comprises for example a secure element 103 (SE) adapted to processing critical and/or secret data. Secure element 103 may comprise its own processor(s), its own memory or memories, etc.

There are called, in the rest of the disclosure, critical data elements and secret data elements data elements having a content which is not intended to be public, and, thus, the access to which is restricted to certain specific persons and/or circuits. An encryption and/or decryption key is considered as being a critical and/or secret data element since such a key enables to encode critical and/or secret data, and/or to decode encrypted data elements.

Electronic device 100 may further comprise interface circuits 104 (IO/OUT) adapted to sending and/or to receiving data elements originating from the outside of device 100. Interface circuits 104 may further be adapted to implementing a display of data elements, for example, a display screen.

Electronic device 100 further comprises different circuits 105 (FCT) adapted to carrying out different functions. As an example, circuits 105 may comprise measurement circuits, data conversion circuits, circuits for controlling electrical or electromechanical equipment, etc.

Electronic device 100 further comprises one or a plurality of data buses 106 adapted to transferring data between its different components.

Figure 2:
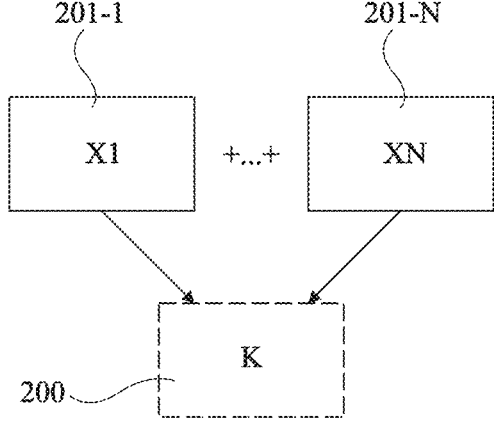
FIG. 2 very schematically shows in the form of blocks an example of arithmetic decomposition of a data element.

FIG. 2 very schematically illustrates in the form of blocks an example of additive decomposition of a data element 200 ($k$).

Data element 200, called data element k in the rest of the disclosure, is a data element forming part of a space of dimension Mk. According to a preferred embodiment, dimension Mk is a prime number. Data element k may be, for example, a critical and/or secret data element adapted to being used by a device of the type of the device 100 described in relation with FIG. 1. According to an embodiment, data element k is an encryption and/or decryption key. According to an example of embodiment, data element k is an encryption and/or decryption key and more precisely an elliptic curve encryption key, integer Mk represents the field of the elliptic curve thanks to which data element k is obtained.

Data element k is, for example, obtained by a random number generator comprised in device 100, for example constituted by one of functions of circuits 105. According to another example, data element k is generated by processor 101 or by secure element 103.

According to an embodiment, data element k is not conventionally stored in a memory 102 of the electronic device, but is decomposed into N data elements 201-1 (X1), . . . , 201-N (XN) which are stored in one or a plurality of memories 102 of the electronic device 100. This type of decomposition is called additive decomposition, since the sum, modulo Mk, of the N data elements 201-1 to 201-N is equal to data element k. According to an embodiment, N is an integer greater than or equal to one. According to a preferred embodiment, N is an integer greater than or equal to two.

In other words, data element k is provided by the following mathematical formula A:

$$k = \left( \sum_{i=1}^{N} Xi \right) \bmod (Mk) \qquad \text{Math 4}$$

where:
  data elements Xi represent data elements 201-1, . . . , to
    201-N; and mod( ) represents the operator expressing the congruence, also called modulo operator.

Thus, according to a first example, if N is equal to two, then:

$$k = X1 + X2 \qquad \text{Math 5}$$

or $$k = X1 + X2 - Mk \qquad \text{Math 6}$$

Thus, according to a second example, if N is equal to three, then:

$$k = X1 + X2 + X3 \qquad \text{Math 7}$$

or $$k = X1 + X2 + X3 - Mk \qquad \text{Math 8}$$

or $$k = X1 + X2 + X3 - 2 * Mk \qquad \text{Math 9}$$

According to an embodiment, data elements 201-1 to 201-N, called data elements X1 to XN hereafter, are all independent from data element k. In other words, data elements X1 to XN are only linked to data element k by the previously-given mathematical formula A, that is, the sum of data X1 to XN.

According to an example, the decomposition of data element k is obtained by using a random data generation function. N−1 data elements X1 to XN−1 are, par example, randomly generated, and the last data element XN is obtained by applying formula A.

There exists a multitude of possible additive decompositions for a data element. It is thus possible to change the decomposition data elements, for example if data elements X1, . . . , XN have become accessible. It is sufficient, for example, to generate N−1 new random data elements and to determine the last one by applying formula A.

Figure 3:
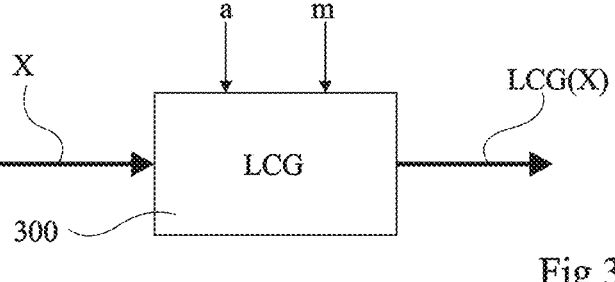
FIG. 3 very schematically shows in the form of blocks a linear congruential generation function.

FIG. 3 very schematically illustrates in the form of blocks an implementation mode of a function 300 (LCG).

Function 300 is a linear congruential generation function, or linear congruential generator 300, adapted to receiving, as an input, a data element X and to delivering, as an output, a data element LCG(X) having an expression depending on two parameters a and m. Parameter a is called multiplier of function 300. Parameter m is called module of function 300. According to an example, parameters a and m are integers. According to an example, the parameters a and m are integers other than zero, and the integer m is greater than or equal to two. The LCG function is, for example implemented by the processor 101, the secure element 103 or one of the functions of the circuits 105.

Data element LCG(X) is provided by the following mathematical formula:

$$LCG(X) = (a * X) \bmod(m) \qquad \text{Math 10}$$

where * represents the multiplication operator.

A function of the type of function 300 is generally used in random number generators. Those skilled in the art will be capable of selecting appropriate values of parameters a and m to optimize the characteristics of function 300. Examples of optimized values of these parameters are provided in the article entitled "*Tables of linear congruential generators of different sizes and good lattice structure*" by Pierre L'Ecuyer, published in January 1999 in magazine Mathematics of Computation.

According to an embodiment, to minimize the computation times and the resources of a device executing function 300, it is possible to use a polynomial decomposition of a data element to more rapidly compute its image by function 300.

According to an example, consider a data element D, or variable D, belonging to a space of dimension L, and its decomposition into a polynomial of rank P, P being an integer, of radical r, and of coefficients d0, d1, . . . , dP−1. Data element D is thus provided by the following mathematical formula:

$$D = \left( \sum_{j=0}^{P-1} dj * r^j \right) \bmod() \qquad \text{Math 11}$$

The image LCG(D) of data element D by function 300 is provided by the following mathematical formula:

$$LCG(D) = \left( \sum_{j=0}^{P-1} dj * LCG(r^j) \right) \bmod(L) \qquad \text{Math 12}$$

To optimize the time of computing of image LCG(D), it is sufficient to previously record the values of images LCG($r^j$), j being an integer varying from 0 to P−1.

Figure 4:
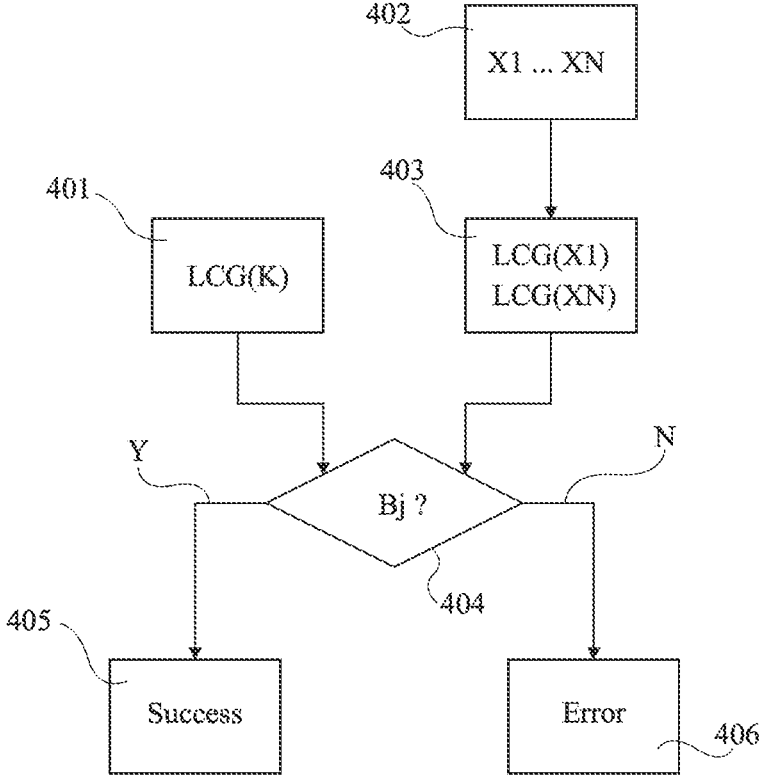
FIG. 4 shows a block diagram illustrating an implementation mode of a method of checking an encryption and/or decryption key.

FIG. 4 is a block diagram showing an implementation mode of a method of cyclic redundancy check or method of checking of data element k defined in relation avec FIG. 2 and using the function 300 described in relation with FIG. 3.

The method of checking data element k is a cyclic redundancy check method enabling to detect transmission, combination, and/or algorithm application errors.

This checking method is adapted to being implemented by the device 100 described in relation with FIG. 1, or by a device of the type of device 100.

At an initialization step 401 (LCG(k)), a data element LCG(k) representing the image of data element k by function 300 is obtained by processor 101, by secure element 103 or by one of the functions of circuits 105. According to an embodiment, image LCG(k) is computed and stored in a memory of device 100, but the actual data element k is not stored in the memory. This step may be implemented from as soon as the generation of data element k. An example of a technique for computing data element LCG(k) is described in relation with FIG. 3.

At another initialization step 402 (X1, . . . , XN), the decomposition of data element k into data elements X1 to XN is obtained, for example, by using the technique described in relation with FIG. 2, executed by processor 101, by secure element 103 or by one of the functions of circuits 105. According to an embodiment, data elements X1 to XN are all stored in one or a plurality of memories of device 100. This step may also be implemented from as soon as the generation of data element k.

At a step 403 (LCG(X1), . . . , LCG(XN)), subsequent to step 402, data elements LCG(X1) to LCG(XN) representing the images of data elements X1 to XN by function 300 are obtained by processor 101, by secure element 103 or by one of the functions of circuits 105. According to an embodiment, images LCG(X1) to LCG(XN) are computed and stored in a memory 102 of device 100. This step may be implemented from as soon as the generation of data element k, like step 402.

At a step 404 (Bj), subsequent to steps 401 and 403, N second equalities Bj, j being an integer varying from 0 to N−1, are checked by processor 101, by secure element 103 or by one of the functions of circuits 105. Each equality Bj is provided by following mathematical formula:

$$(Bj):LCG(k) = \left( j * LCG(Mk) + \sum_{i=1}^{N} LCG(Xi) \right) \mod(m) \qquad \text{Math 13}$$

To perform these checkings, the data obtained at steps 401 to 403 are used.

If one of equalities Bj is verified (output Y) then the next step is a step 405 (Success). Otherwise (output N), the next step is a step 406 (Error).

In practice, step 404 may be implemented iteratively, by incrementing integer j by one. More particularly, step 404 starts with the checking of equality B0, if the latter is not verified, then equality B1 is checked and so on.

At step 405, one of equalities Bj has been verified, it is thus considered that data elements X1 to XN are correct and enable to obtain data element k. Data elements X1 to XN may be used instead of data element k in all the linear operations with respect to the sum modulo Mk.

At step 406, none of equalities Bj has been verified. The decomposition of data element k into data elements X1 to XN thus exhibits errors, and data elements X1 to XN thus cannot be used to obtain data element k.

An advantage of this checking method is that it is faster to implement than a conventional cyclic redundancy check method.

Another advantage of this method is that the risk of making data element k accessible is much lower than with a conventional cyclic redundancy check method. Indeed, data element k is not stored in a memory, and data elements X1 to XN are all independent from data element k. One should thus have access to all the data elements X1 to XN to obtain data element k.

Still another advantage of this method is that is can be used in devices implementing different types of encryption algorithm such as elliptic curve encryption algorithms, RSA encryption, signature algorithms such as those known under trade name CRYSTALS-Dilithium, or key encapsulation algorithms known under trade name CRYSTALS-Kyber. Thus, data element k may be a secret data element used in any of the previously-mentioned algorithms.

Figure 5:
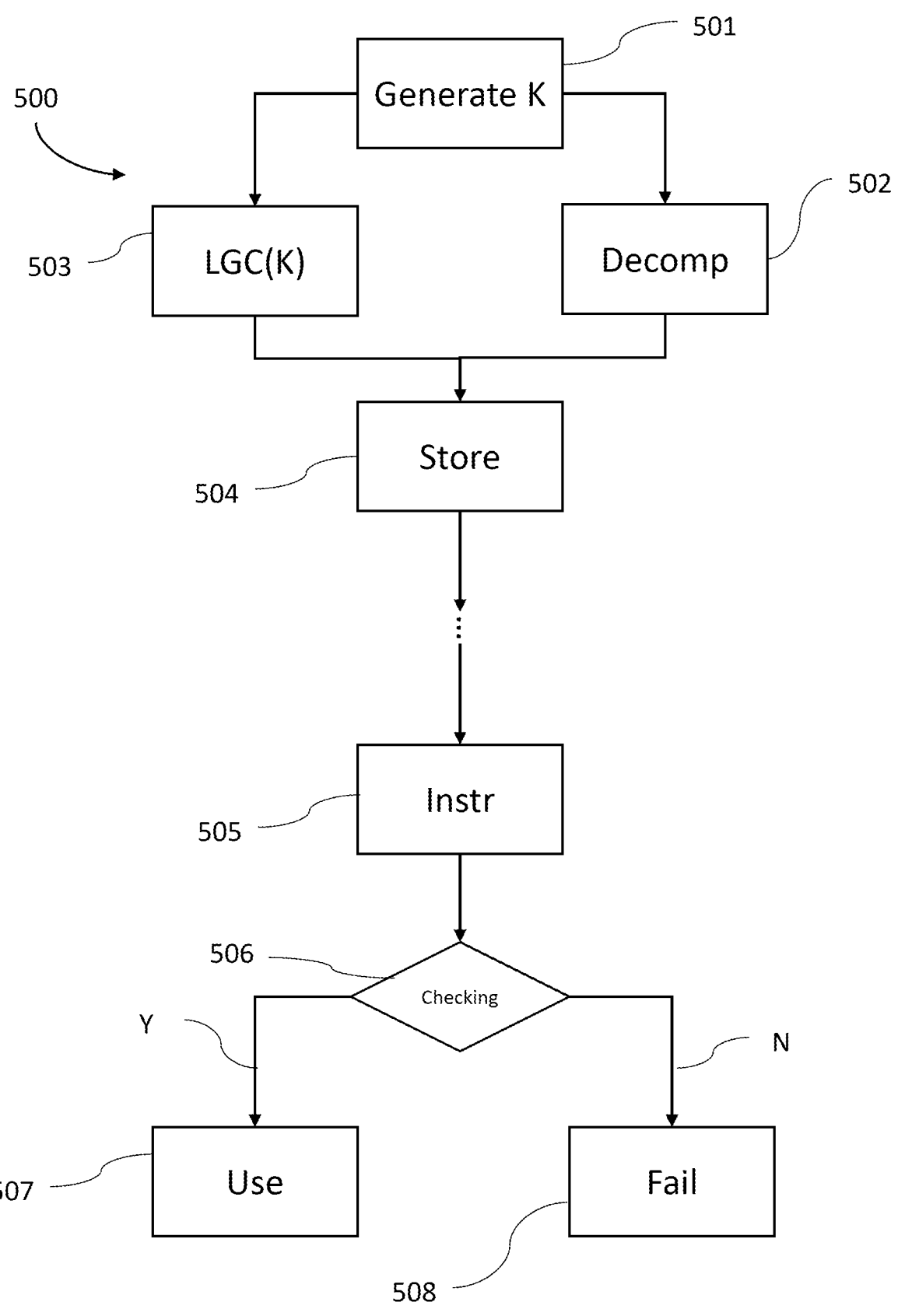
FIG. 5 shows a block diagram illustrating an implementation mode of a method of using an encryption and/or decryption key.

FIG. 5 is a bloc diagram illustrating a method of using data element k disclosed in relation with FIG. 2. This method is executed by an electronic device D of type of electronic device 100 described in relation with FIG. 1. More particularly, electronic device D comprises at least a processor P and a memory M. Processor P can be any type of processor described in relation with FIG. 1, and memory M can be any type of memory described in relation with FIG. 1.

At an initial step 501 (Generate k), executed by processor P, data element k is generated. According to an embodiment, data element k is a critical and/or secret data, such as an encryption and/or decryption key as described in relation with FIG. 2, that must not be stored in memory.

At a step 502 (Decomp), following step 501, executed by processor P, an arithmetic decomposition of data element k is prepared. In other words, the N independent data element X1, XN, described in relation with FIG. 2, are generated as described in relation with FIG. 2.

At a step 503 (CRC(k)), following step 501, executed by processor P, an image LCG(k) of the data element k by a linear congruential generation function, such as function 300 described in relation with FIG. 3, is calculated using data element k.

According to a variant, step 503 follows step 502, and the image LCG(k) is calculated by using data elements X1, . . . , XN, and not directly data element k.

At a step 504 (Store), following steps 502 and 503, executed by processor P and memory M, data elements X1, . . . , XN and the image LCG(k) are all stored in the memory M. All existing copy of data element k are deleted for safety purposes.

At a step 505 (Instr), following step 504, executed by processor P, the processor P receives an instruction requesting the use of data element k. If data element k is an encryption and/or decryption key, the instruction may be an encryption and/or decryption instruction. In order to execute the instruction, processor P has only access to data element X1, . . . , XN and not to data element k.

At a step 506 (Checking), following step 505, executed by processor P, processor P execute method of checking described in relation with FIG. 4, to verify if all data element X1, . . . , XN have been correctly retrieved in memory M, and if all data element X1, . . . , XN have not been modified. If method of checking described in relation with FIG. 4 is a success (output Y) then the next step is a step 507 (Use). Otherwise (output N), the next step is a step 508 (Fail).

At step 507, executed by processor P, method of FIG. 4 has proven that all data element X1, . . . , XN are correct, processor P can execute the instruction received in step 505 by using data element X1, . . . , XN.

At step 508, executed by processor P, method of FIG. 4 has proven that at least one data element amongst data element X1, . . . , XN is not correct, processor P cannot execute the instruction it received in step 505.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

Method of checking a first data element (k), executed by an electronic device (100) may be summarized as including a processor (101) and a memory (102), wherein said first data element (k) is not stored in said memory and is divided in N second data elements (X1, . . . , XN) independent from the first data element (k), each second data element (X1, . . . , XN) being stored in said memory, and first data element (k) being equal to the sum, modulo the dimension (Mk) of a space including said first data element (k), of said N second data elements (X1, . . . , XN), wherein an image of the first data element (k) by a linear congruential generation function (300) is stored in said memory, and said method including a step, executed by said processor, of checking if said image of the first data element (k) by said linear congruential generation function (300) is equal to the sum, modulo the module of said linear congruential generation function, of a product of an integer (j) varying from 0 to N−1 and an image of said dimension (Mk) by said linear congruential generation function, and of the images of said second data elements (X1, . . . , XN) by the linear congruential generation function.

Electronic device (100) may be summarized as including a processor (101) and a memory (102), and configured to implement a method of checking a first data element (k), wherein said first data element (k) is not stored in said memory and is divided in N second data elements (X1, . . . , XN) independent from the first data element (k), each second data element (X1, . . . , XN) being stored in said memory, and first data element (k) being equal to the sum, modulo the dimension (Mk) of a space including said first data element (k), of said N second data elements (X1, . . . , XN), wherein an image of the first data element (k) by a linear congruential generation function (300) is stored in said memory, and said method including a step, executed by said processor, of checking if said image of the first data element (k) by said linear congruential generation function (300) is equal to the sum, modulo the module of said linear congruential generation function, of a product of an integer (j) varying from 0 to N–1 and an image of said dimension (Mk) by said linear congruential generation function, and of the images of said second data elements (X1, . . . , XN) by the linear congruential generation function.

Method or device, wherein at least one of said N second data elements (X1, . . . , XN) may be obtained randomly.

Method or device, wherein said dimension (Mk) may be a prime number.

Method or device, wherein to compute the image of a variable by the function (300), the following successive steps may be implemented: decomposition of said variable into a polynomial; and application of said function (300) to said polynomial.

Method or device, wherein the image of a radical (r) of said polynomial by said function (300) may have already been previously computed.

Method or device, wherein integer N may be greater than or equal to two.

Method or device, wherein the first data element (k) may be an encryption and/or
decryption key.

Method or device, wherein said first data element (k) may be a secret data element capable of being used in different types of encryption algorithm such as elliptic curve encryption algorithms, RSA encryption, signature algorithms such as those known under trade name CRYSTALS-Dilithium, or key encapsulation algorithms known under trade name CRYSTALS-Kyber.

Method of using first data element (k) may be summarized as including the method of checking said first data element (k).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for error detection of an encryption or decryption key, executed by an electronic device comprising a processor and a memory, wherein a first data element corresponding to a value of the encryption or decryption key is not stored in the memory and the value of the encryption or decryption key is decomposed into N second data elements independent from the first data element, each second data element being stored in the memory, and the first data element being equal to the sum, modulo the dimension of a space comprising the first data element, of the N second data elements, wherein an image of the first data element by a linear congruential generation function is stored in the memory, and wherein the method comprises:

receiving, by at least the processor, an instruction to use the encryption or decryption key;

determining, by at least the processor, whether the image of the first data element by the linear congruential generation function is equal to the sum, modulo the module of the linear congruential generation function, of a product of an integer varying from 0 to N-1 and an image of the dimension by the linear congruential generation function, and of the images of the second data elements by the linear congruential generation function; and responsive to a positive result from the determining, executing the instruction to use the encryption or decryption key.

2. The method according to claim 1, wherein at least one of the N second data elements is obtained randomly.

3. The method according to claim 1, wherein the dimension is a prime number.

4. The method according to claim 1, wherein to compute the image of a variable by the function, the method comprises performing:

decomposition of the variable into a polynomial; and application of the function to the polynomial.

5. The method according to claim 4, wherein the image of a radical of the polynomial by the function has already been previously computed.

6. The method according to claim 1, wherein integer N is greater than or equal to two.

7. The method according to claim 1, wherein the first data element is a secret data element capable of being used in encryption methods including at least one of elliptic curve encryption algorithms, RSA encryption, signature algorithms, or key encapsulation algorithms.

8. An electronic device comprising a processor and a memory, and configured to implement a method for error detection of an encryption or decryption key, wherein a first data element corresponding to a value of the encryption or decryption key is not stored in the memory and the value of the encryption or decryption key is decomposed into N second data elements independent from the first data element, each second data element being stored in the memory, and the first data element being equal to the sum, modulo the dimension of a space comprising the first data element, of the N second data elements, wherein an image of the first data element by a linear congruential generation function is stored in the memory, and wherein the method comprises:

receiving, by at least the processor, an instruction to use the encryption or decryption key;

determining, by at least the processor, whether the image of the first data element by the linear congruential generation function is equal to the sum, modulo the module of the linear congruential generation function, of a product of an integer varying from 0 to N-1 and an image of the dimension by the linear congruential generation function, and of the images of the second data elements by the linear congruential generation function; and responsive to a positive result from the determining, executing the instruction to use the encryption or decryption key.

9. The device according to claim 8, wherein at least one of the N second data elements is obtained randomly.

10. The device according to claim 8, wherein the dimension is a prime number.

11. The device according to claim 8, wherein to compute the image of a variable by the function, the method comprises performing:

decomposition of the variable into a polynomial; and application of the function to the polynomial.

12. The device according to claim 11, wherein the image of a radical of the polynomial by the function has already been previously computed.

13. The device according to claim 8, wherein integer N is greater than or equal to two.

14. The device according to claim 8, wherein the first data element is a secret data element capable of being used in encryption methods including at least one of elliptic curve encryption algorithms, RSA encryption, signature algorithms, or key encapsulation algorithms.

15. A non-transitory computer-readable medium storing content that cause one or more processors to implement a method for error detection of a data element, wherein a first data element corresponding to a value of the encryption or decryption key is not stored in the memory and the value of the encryption or decryption key is decomposed into N second data elements independent from the first data element, each second data element being stored in the memory, and the first data element being equal to the sum, modulo the dimension of a space comprising the first data element, of the N second data elements, wherein an image of the first data element by a linear congruential generation function is stored in the memory, and wherein the method comprises:

receiving, by at least the processor, an instruction to use the encryption or decryption key:

determining, by at least the processor, whether the image of the first data element by the linear congruential generation function is equal to the sum, modulo the module of the linear congruential generation function, of a product of an integer varying from 0 to N-1 and an image of the dimension by the linear congruential generation function, and of the images of the second data elements by the linear congruential generation function; and responsive to a positive result from the determining, executing the instruction to use the encryption or decryption key.

16. The computer-readable medium according to claim 15, wherein at least one of the N second data elements is obtained randomly.

17. The computer-readable medium according to claim 15, wherein the dimension is a prime number.

18. The computer-readable medium according to claim 15, wherein to compute the image of a variable by the function, the method comprises performing:

decomposition of the variable into a polynomial; and application of the function to the polynomial.

19. The computer-readable medium according to claim 18, wherein the image of a radical of the polynomial by the function has already been previously computed.

20. The computer-readable medium according to claim 15, wherein the first data element is an encryption or decryption key.

* * * * *